United States Patent [19]
Gage

[11] Patent Number: 5,839,327
[45] Date of Patent: Nov. 24, 1998

[54] DRIVE AXLE ASSEMBLY WITH LUBRICANT COOLING SYSTEM

[75] Inventor: Garrett W. Gage, Goodrich, Mich.

[73] Assignee: American Axle & Manufacturing, Inc., Detroit, Mich.

[21] Appl. No.: 673,498

[22] Filed: Jul. 1, 1996

Related U.S. Application Data

[60] Provisional application No. 60/003,930 Sep. 18, 1995.

[51] Int. Cl.⁶ .................................................. F16H 57/04
[52] U.S. Cl. ............................ 74/607; 184/11.1; 184/13.1
[58] Field of Search ................................ 74/607, 606 A, 74/606 R, 467; 184/11.1, 13.1

[56] References Cited

U.S. PATENT DOCUMENTS

| | | |
|---|---|---|
| 1,247,276 | 11/1917 | Hurlburt . |
| 1,741,501 | 12/1929 | Crawford ............................ 184/11.1 X |
| 1,775,623 | 9/1930 | Morgan .................................. 184/13.1 |
| 1,950,034 | 3/1934 | Mulford et al. ............................ 74/99 |
| 1,966,434 | 7/1934 | Barker ....................................... 184/11 |
| 2,015,108 | 9/1935 | Harper .................................. 184/11.1 |
| 2,802,548 | 8/1957 | Mart et al. .................................. 184/6 |
| 3,153,464 | 10/1964 | Nelson et al. ......................... 74/467 X |
| 3,847,249 | 11/1974 | Oehring ....................................... 184/6 |
| 4,244,242 | 1/1981 | Uno et al. ................................... 74/710 |
| 4,261,219 | 4/1981 | Suzuki et al. .............................. 74/467 |
| 4,352,301 | 10/1982 | Fleury ....................................... 74/467 |
| 4,612,818 | 9/1986 | Hori et al. ................................. 74/467 |
| 4,677,871 | 7/1987 | Taniyama et al. ..................... 74/607 X |
| 4,915,192 | 4/1990 | Hayashida et al. ...................... 180/309 |
| 5,197,929 | 3/1993 | Scheiber et al. ......................... 475/160 |
| 5,316,106 | 5/1994 | Baedke et al. .......................... 184/6.12 |
| 5,540,300 | 7/1996 | Downs et al. ........................... 184/11.2 |

FOREIGN PATENT DOCUMENTS

| | | |
|---|---|---|
| 0067639 | 12/1982 | European Pat. Off. . |
| 0612938 | 8/1994 | European Pat. Off. . |
| 40 23 354A | 1/1992 | Germany . |
| 9011907 | 10/1990 | WIPO . |

*Primary Examiner*—Charles A. Marmor
*Assistant Examiner*—MaryAnn Battista
*Attorney, Agent, or Firm*—Reising, Ethington, Learman & McCulloch

[57] ABSTRACT

A drive axle assembly has a gear housing, two axle tubes extending outwardly of the gear housing, a lubricant reservoir in the gear housing and a gear assembly rotatably mounted in the gear housing that has a rotatable ring gear that is partially disposed in lubricant in the lubricant reservoir. The drive axle assembly also has a lubricant cooling system that includes a cooler cover that is attached to the gear housing to provide a lubricant passage in fluid communication with the lubricant reservoir via an inlet that is juxtaposed the rotatable ring gear. The lubricant passage has elevated outlets that are connected to the respective axle tubes. The axle tubes are connected to the reservoir via restricted outlet passages that are below the outlets of the lubricant passage. The outlets of the lubricant passage and the axle tubes a re sized so that there is a flood of lubricant in the axle tubes when the rotatable ring gear is driven at or above a predetermined speed. The flood of lubricant extends for the length of the axle tubes and cools the lubricant in the axle tubes. The rotating axle shafts are immersed in the flood of lubricant and churn the lubricant in the axle tubes to enhance heat transfer.

13 Claims, 5 Drawing Sheets

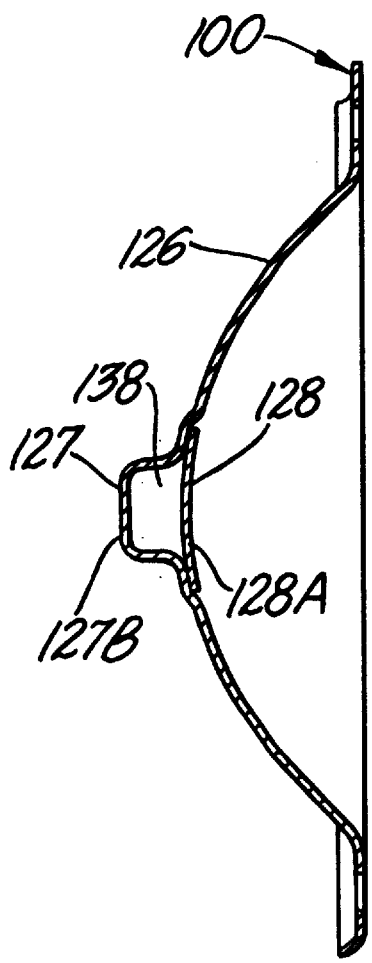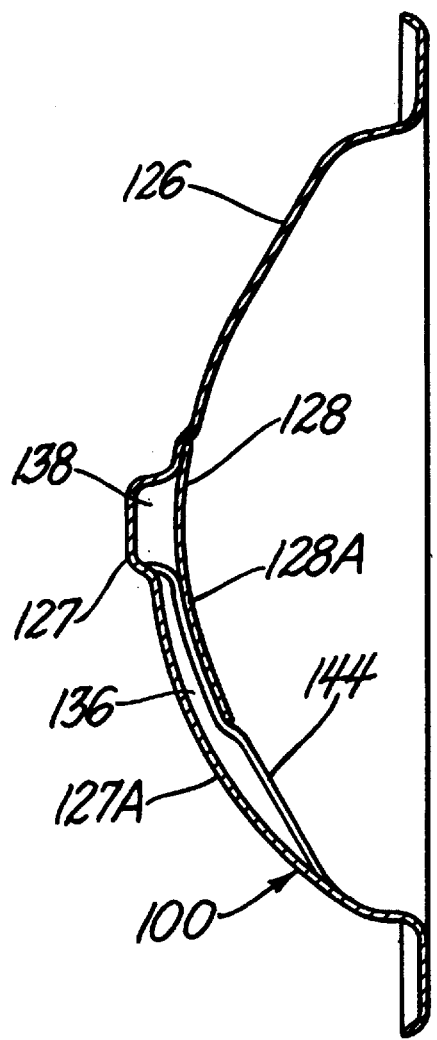

DRIVE AXLE ASSEMBLY WITH LUBRICANT COOLING SYSTEM

This application claims benefit of the filing date of and right of priority of U.S. Provisional application Ser. No. 60/003,930 filed Sep. 18, 1995 under 35 USC §119(e).

BACKGROUND OF THE INVENTION

This invention relates generally to drive axles and more particularly to drive axles that include a lubricant cooling system.

U.S. Pat. No. 1,247,276 granted to William B. Hurlburt Nov. 20, 1917 discloses a self oiling rear axle wherein a gear wheel throws oil from a sump up into a shell. The shell has a close fit with a worm wheel that drives the gear wheel. This worm wheel forces the oil into a duct that feeds the oil to inner and outer bearings through a network of interconnected ducts. The oil then returns to the sump. The patent does not discuss oil temperature nor mention oil cooling.

U.S. Pat. No. 1,950,034 granted to William A. Mulford et al Mar. 6, 1934 discloses a rear axle that has oil cooling provisions. This rear axle has a ring gear that carries scoops that dip into oil in the bottom of the housing and throw the oil up into the interior of a worm housing. The worm housing includes external fins for cooling the oil that is thrown into the worm housing. The worm gear then pumps the oil through oil passages to the worm bearings. The oil then circulates through the worm bearings and returns to the bottom of the housing.

U.S. Pat. No. 4,352,301 granted to Edward Fleury Oct. 5, 1982 discloses an axle assembly that also has an oil cooling system. This oil cooling system includes a small lubrication pump that picks up oil from a reservoir in a gear housing and pumps the oil through an external filter to cool and clean the oil. The filtered oil is returned by pipes that extend through the axle tubes. The returning oil flows outwardly along the axle tubes so that oil is sprayed onto the ends of the half shafts and delivered to the shaft end bearings via holes. The oil then returns to the axle tubes via reduction gear assemblies and drains back to the gear housing by gravity. The patent states that the oil is cooled due to the circulation through the external filter and also indicates that an external oil cooler may be added if the cooling provided by the external filter is insufficient.

German Patent Application DE 40 23 354 applied for by Mercedes-Benz Aktiengelesschaft and published Jan. 30, 1992 discloses a drive axle assembly that is equipped with an oil circulation system. In this system, a ring gear splashes oil from a reservoir up into an elevated internal chamber in the differential housing portion of an axle housing. The oil accumulates in the elevated chamber and then flows by gravity to axle bearings and hub gears at the outboard ends of the axle housing via internal conduits. The oil then flows back to the reservoir through the central passages of the axle housing that surround the axle shafts. The continuous exchange of oil reduces the operating temperature of the hub gears at the outboard ends of the axle housing.

None of the above patent documents disclose a drive axle assembly with a lubricant cooling system that is simple, efficient and economical.

SUMMARY OF THE INVENTION

The object of this invention is to provide a drive axle that has a lubricant cooling system that is simple, efficient and economical. This is achieved by using the rotation of the differential ring gear to flood the axle tubes with lubricant for cooling without any need for a pump, an elevated accumulator chamber in the gear housing, or internal conduits in the axle tubes.

A feature of the invention is that the drive axle assembly includes a lubricant passage that is in constant fluid communication with an internal lubricant reservoir of the drive axle assembly so that as to provide an effective and efficient means for a rotating ring gear to deliver lubricant to the axle tubes for cooling.

Another feature of the invention is that the drive axle assembly includes a lubricant passage that is in constant fluid communication with the reservoir of the drive axle and arranged so a that rotating ring gear flows lubricant into the lubricant passage for effective and efficient delivery of the lubricant to the axle tubes for cooling.

Still another feature of the invention is that the drive axle assembly includes a lubricant flow passage that is easily and conveniently formed by a cover or cover assembly that eliminates any need for significant modification to existing drive axle designs.

Still another feature of the invention is that the drive axle assembly includes a lubricant flow passage that is provided by a cover or cover assembly that is easily manufactured and installed without any need for any substantial change to the housing of existing drive axle designs.

Still another feature of the invention is that the drive axle assembly includes a lubricant flow passage that allows overfill so as to accommodate a larger range of vehicle speeds.

Yet another feature of the invention is that the drive axle assembly does not require any internal or external lubricant delivery ducts for carrying lubricant away from the gear housing other than the axle tubes themselves.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 9 is a section taken substantially along the line 9—9 of FIG. 7 looking in the direction of the arrows; and FIG. 10 is a section taken substantially along the line 10—10 of FIG. 7 looking in the direction of the arrows.

DESCRIPTION OF THE INVENTION

Figure 1:
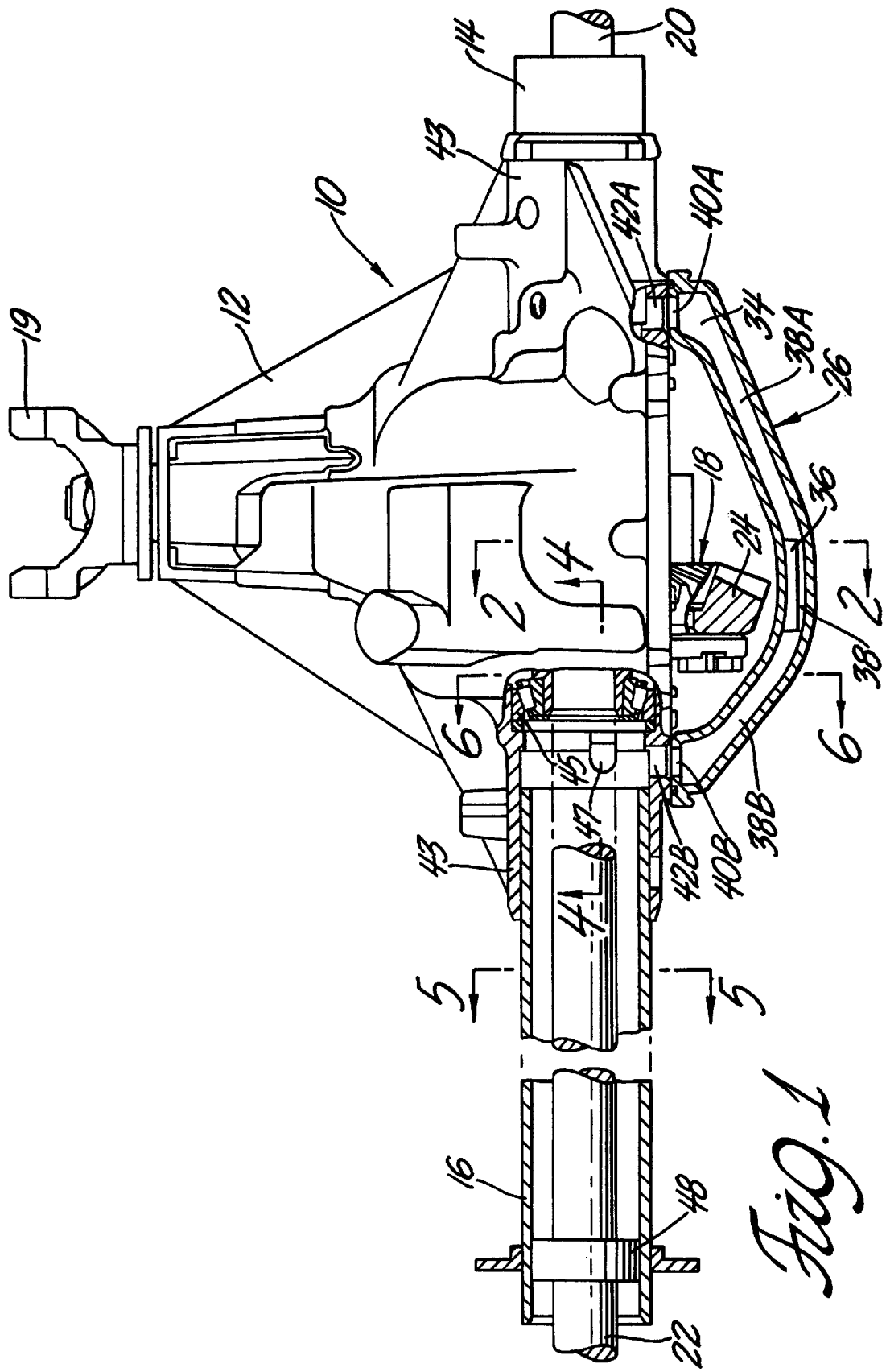
FIG. 1 is a partially sectioned plan view of a drive axle assembly equipped with a lubricant cooling system in accordance with the invention.

Referring now to the drawing, a drive axle assembly 10 of the invention is shown as having a gear housing 12 and two axle tubes 14 and 16 extending outwardly from opposite sides of the gear housing.

A differential gear assembly 18 is rotatably mounted in the gear housing 12 and drivingly connected to an engine driven propeller shaft (not shown) by a yoke 19 for transferring power to a pair of vehicle wheels (not shown) via drive shafts 20 and 22 that extend through the respective axle tubes 14 and 16.

The differential gear assembly 18 is a conventional bevel gear differential of the type that is customarily used in automotive drive axles, particularly rear axles. A bevel gear differential operates in a well known manner so that its operation need not be described in detail for those skilled in the art to understand the invention.

The differential assembly 18 includes a ring gear 24 that is driven by a pinion gear (not shown) that is attached to the end of a stub shaft 25 that is connected to the propeller shaft (not shown) by yoke 19. When the drive axle assembly 10 is installed in a vehicle, the ring gear 24 rotates in one direction or the other whenever the vehicle is in motion.

The differential assembly 18 is installed in the gear housing 12 through a large rear opening that is conventionally closed by a stamped metal cover after the differential assembly 18 is installed. The drive axle assembly 10 of the invention has a special cooler cover 26 that may be cast of a light metal such as aluminum or aluminum alloy. The cooler cover 26 provides an important feature of the invention as explained below.

Figure 2:
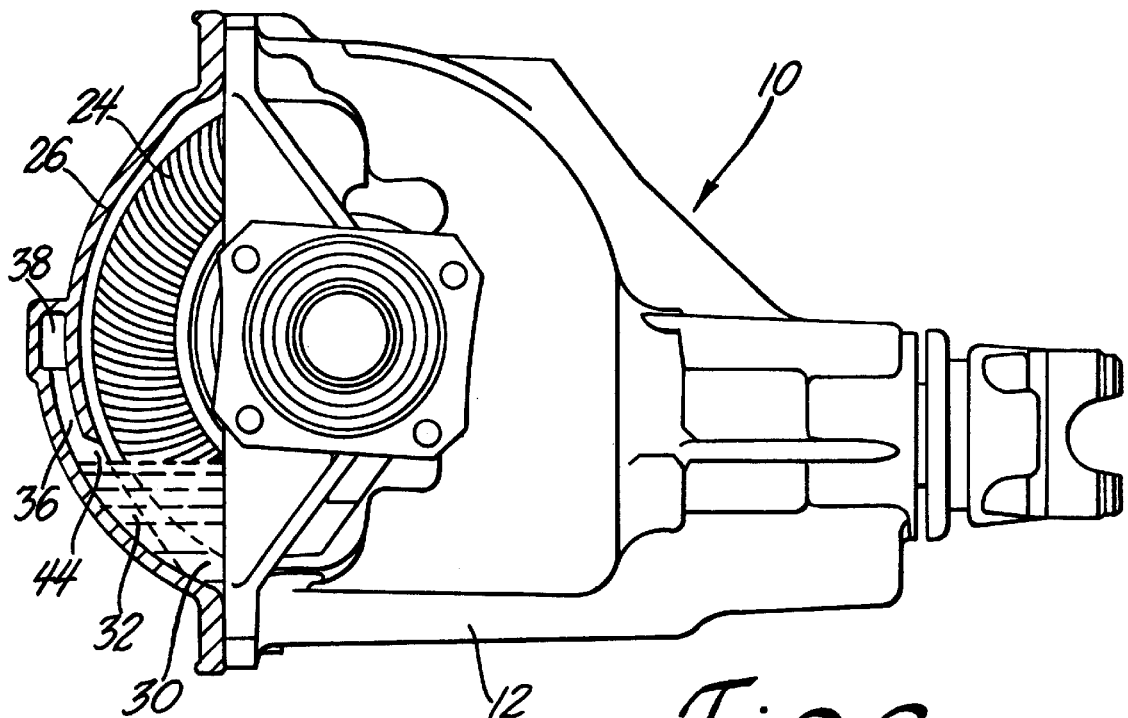
FIG. 2 is a section taken substantially along the line 2—2 of FIG. 1 looking in the direction of the arrows.

When the cover 26 is attached to the gear housing 12, a lubricant reservoir 30 is formed inside the gear housing 12. This reservoir is filled with lubricant 32 to a predetermined fill level so that the rotatable ring gear 24 forming part of the differential gear assembly 18 is partially disposed in lubricant 32 in the lubricant reservoir 30 and partially disposed above the lubricant 32 as best shown in FIG. 2.

As indicated above, the meshing gears of the differential gear assembly are constantly rotating when the vehicle is in motion, particularly, the ring gear 24 and the pinion gear (not shown) that drivingly engages the ring gear 24. This constant working of the meshing gears during vehicle operation, along with other internal frictions, produces heat that raises the temperature of the lubricant 32 in the lubricant reservoir 30. The drive axle assembly 10 of this invention includes a lubricant cooling system that reduces the operating temperature of the lubricant 32.

This lubricant cooling system comprises a a lubricant passage 34 that is integrally formed in the cooler cover 26 which in this instance is cast of an aluminum alloy to reduce weight. The lubricant passage 34 is generally T-shaped and comprises a vertical intake passage 36 that leads to a generally horizontal passage 38. The vertical intake passage 36 intersects the horizontal passage 38 forming two outlet branches 38A and 38B that leads to the respective axle tubes 14 and 16. The outlet branches 38A and 38B communicate with the respective axle tubes 14 and 16 via outlets 40A and 40B at the outboard ends of the branches and aligned outlets 42A and 42B of the gear housing 12. Outlets 42A and 42B are located in sleeve portions 43 of the gear housing 12 adjacent the inner ends of the respective axle tubes 14 and 16 outwardly of the bearings 45 (one shown) that support the differential assembly 18 and the inner ends of the respective axle shafts 20 and 22 in the gear housing 12.

The lubricant passage 34 is designed to regulate flow responsive to rotation of the ring gear 24 as more fully explained below.

The passage 34 is in constant fluid communication with the lubricant reservoir 30 via a large inlet 44 formed in the bottom portion of the vertical intake passage 36 so that the inlet 44 is exposed to lubricant 32 when the lubricant reservoir 30 is filled with lubricant to the predetermined fill level as shown in FIG. 2. Thus the passage 34 is also filled with lubricant to the fill level when the drive axle assembly 10 is idle.

The inlet 44 is disposed in alignment with the rotatable ring gear 24 so that the ring gear 24 pushes lubricant into the lubricant passage 34 as indicated by the arrows 41 when the ring gear 24 rotates in the clockwise direction as viewed in FIG. 2. As the speed of the ring gear 24 increases, the amount of lubricant that is delivered to the lubricant passage 34 increases so that the lubricant in the lubricant passage 34 rises above the fill level while the level of lubricant in the lubricant reservoir 30 recedes.

The vertical intake passage 36 and inlet 44 are shaped to minimize flow resistance and maximize flow into the intake passage 36 in response to the speed of the ring gear 24. Thus the intake passage 36 is relatively wide in comparison to the teeth of the ring gear 24 as best shown in FIGS. 1 and 3 and the inlet 44 extends for the full depth of the lubricant 32 in the reservoir and beyond as best shown in FIG. 2.

The generally horizontal passage 38 is also designed to reduce flow resistance at lower speeds of the ring gear 24 in that the depth of the horizontal passage 38 is greater than the depth of the vertical intake passage 36 at the juncture of the passage 38 and the intake passage 36 as best shown in FIGS. 1 and 2. This increased depth is designed to reduce flow resistance as the lubricant flowing through the passage 34 "turns the corner" from the vertical intake passage 36 into the horizontal branches 38A and 38B.

While the lubricant passage 34 of the cover 26 is designed to reduce lubricant flow resistance as explained above, the lubricant passage 34 is also designed to limit lubricant flow at higher ring gear speeds. This is generally accomplished by orienting the outlet branches 38A and 38B perpendicularly to the vertical intake passage 36. This requires the lubricant flowing through the passage 34 to take a sharp turn from the vertical intake passage 36 into the outlet branches 38A and 38B. This perpendicular orientation restricts lubricant flow through the passage 34 so that the lubricant flow through the passage 34 is relatively constant after the differential ring gear 24 reaches a predetermined speed.

Figure 3:
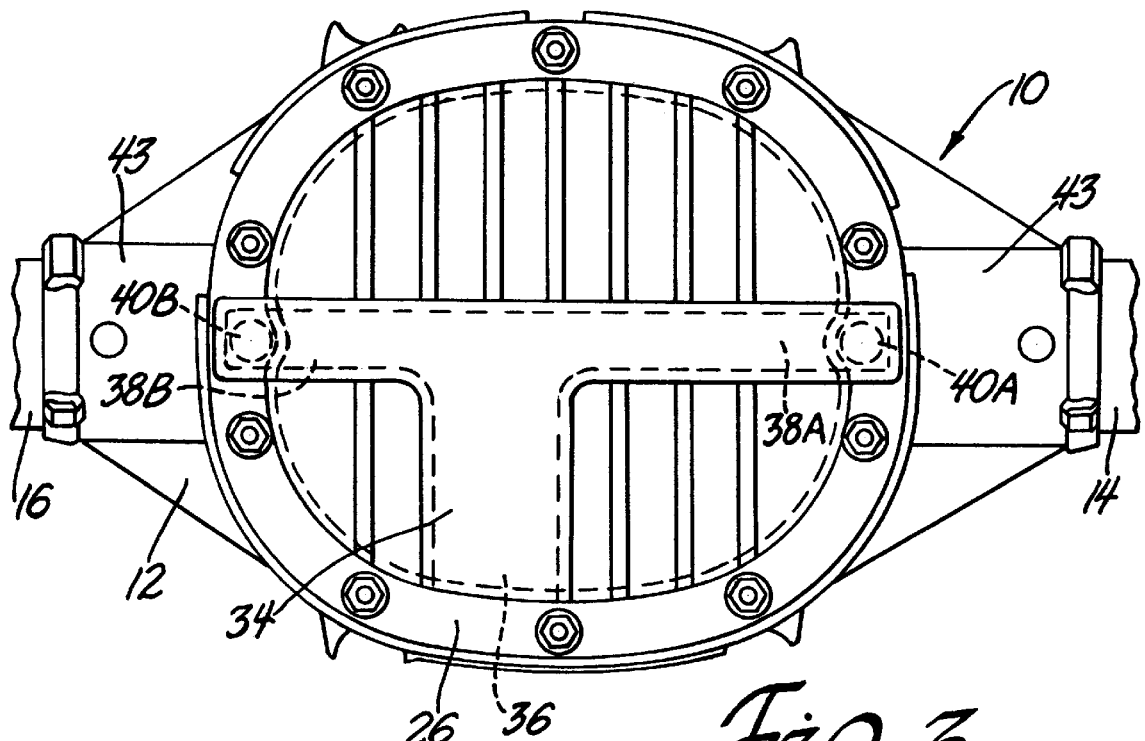
FIG. 3 is a rear view of the drive axle assembly shown in FIG. 1.

As evident from the drawings, particularly FIGS. 2 and 3, the outlets 40A, 40B, 42A and 42B are disposed above the inlet 44 and above the fill level of lubricant 32 in the lubricant reservoir 30. These outlets deliver lubricant from the lubricant passage 34 to the respective axle tubes 14 and 16 when the ring gear 24 reaches a predetermined minimum speed.

The gear housing 12 also has two outlet passages 47 in the sleeve portions 43 (one shown). Outlet passages 47 are located adjacent the inner ends of the respective axle tubes 14 and 16 and outwardly of the bearings 45 (one shown) that support the rotatable differential assembly 18 and the inner ends of the axle shafts 20 and 22. The outlet passages 47 connect the sleeve portions 43 and the inner ends of the axle tubes 14 and 16 to the lubricant reservoir 30 in the bottom of the gear housing 12.

The outlet passages 47 for the axle tubes 14 and 16 are generally aligned vertically with the outlets 40A, 40B, 42A and 42B that deliver lubricant to the axle tubes 14 and 16 as best shown in FIG. 1. However, the outlets 40A, 40B, 42A and 42B which deliver lubricant from the reservoir 30 to the inner ends of axle tubes 14 and 16 and the outlet passages 47 which return lubricant from the inner ends of the axle tubes 14 and 16 back to the reservoir 30 are sized so that lubricant accumulates in the axle tubes 14 and 16 when the ring gear 24 rotates. More specifically the outlets, particularly the gear housing outlets 42A and 42B are sized with respect to the outlet passages 47 so that lubricant entering the axle tubes 20 and 22 floods the axle tubes 20 and 22 in a very short period of time when the differential ring gear 24 rotates at a predetermined minimum speed. When this flooding occurs, the lubricant 32 in the axle tubes 14 and 16 rises above the centerline of the axle shafts 20 and 22 from the inner ends of the axle tubes 14 and 16 to their respective outer ends where the lubricant is contained by the bearings 48. Moreover, the lubricant 32 in the axle tubes 14 and 16 adheres to the rotating axle shafts 20 and 22 so that the entire circumferential surface of the respective rotating axle shafts 20 and 22 is covered with lubricant 32. This emersion churns and mixes the lubricant from the inner ends of the axle tubes 14 and 16 to the bearings 48 at the outer ends.

The flood of lubricant 32 in the axle tubes 14 and 16 is cooled because the large area of the axle tubes 14 and 16 acts as a large heat sink that is kept at a relatively low temperature by ambient air flowing over the outer surfaces of the axle tubes 14 and 16 caused by the motion of the vehicle in which the drive axle assembly 10 is installed.

Figure 4:
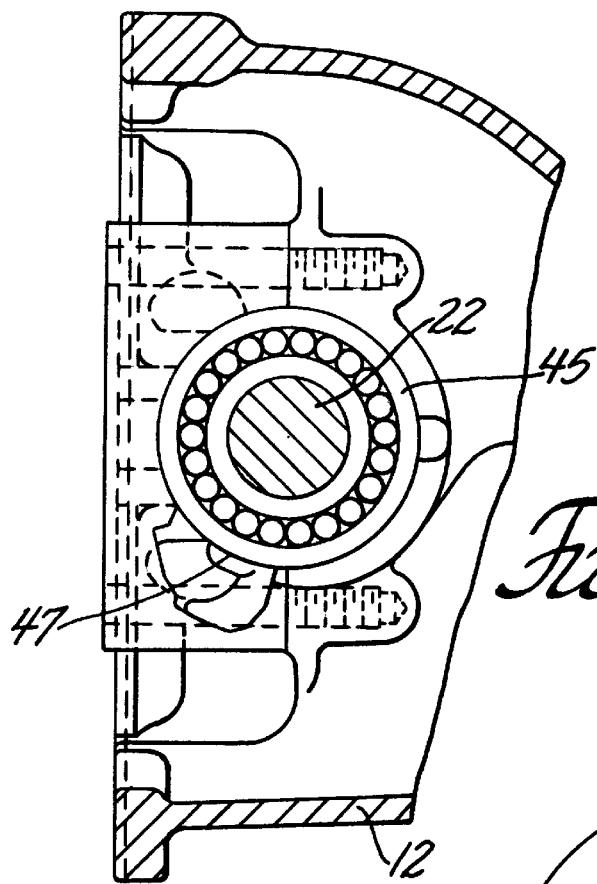
FIG. 4 is a section taken substantially along the line 4—4 of FIG. 1 looking in the direction of the arrows.
Figure 5:
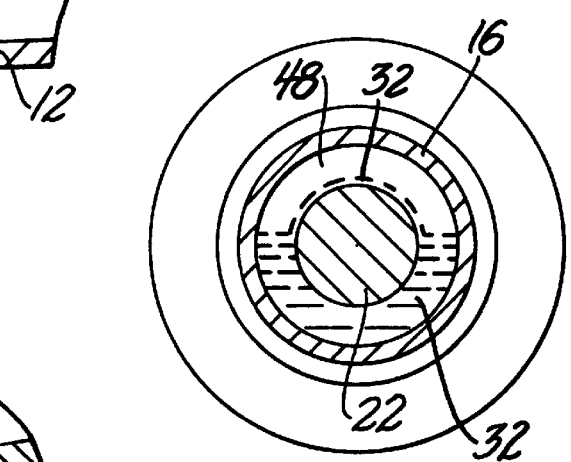
FIG. 5 is a section taken substantially along the line 5—5 of FIG. 1 looking in the direction of the arrows.
Figure 6:
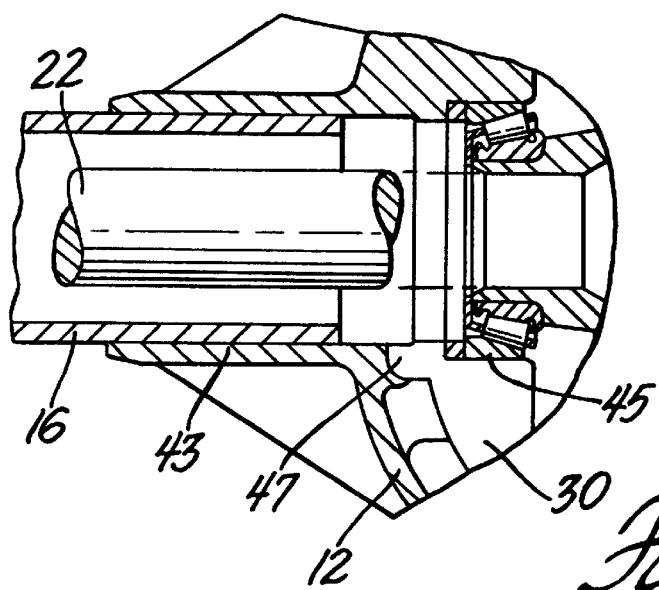
FIG. 6 is a section taken substantially along the line 6—6 of FIG. 1 looking in the direction of the arrows.
Figure 7:
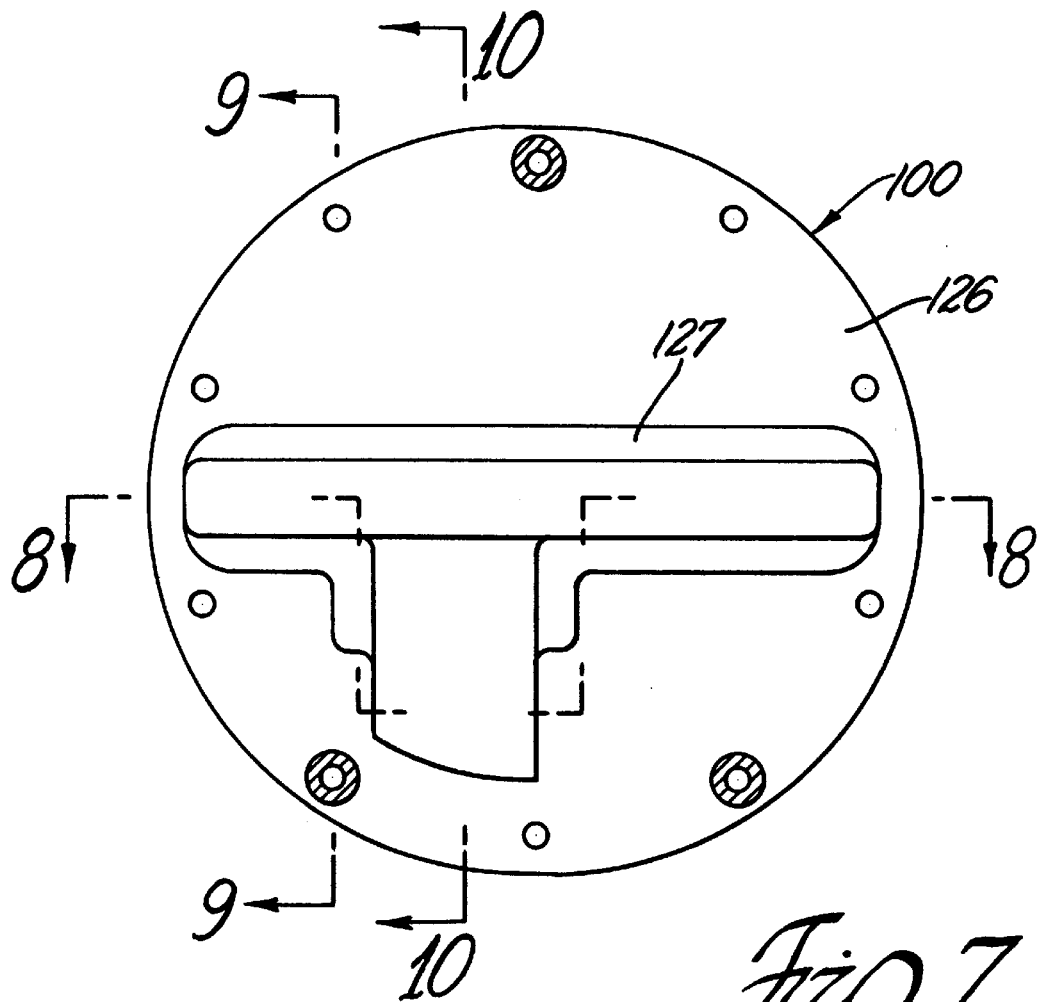
FIG. 7 is a rear view of an alternate two-piece cover for the drive axle assembly shown in FIG. 1.

A portion of this flood of lubricant 32 flows from the axle tubes 14 and 16 back to the lubricant reservoir 30 through outlet passages 47 in the sleeve portions 43 of the gear housing 12 that hold the inner ends of the axle tubes 14 and 16 as shown in FIGS. 1, 4 and 6. The outlet passages 47 are located approximately one inch below the centerline of the axle tubes 14 and 16 and slots 47 allow the returning lubricant to pass between the bearing shims and the gear housing 12 as shown in FIG. 6. This returning lubricant cools the lubricant 32 in the reservoir 30.

Moreover the flood of lubricant 32 in the axle tubes 14 and 16 acts as a heat pipe so that the flood of lubricant itself transfers heat away from the hot area at the outlets 40A, 40B, 42A and 42B to progressively cooler areas toward the outboard ends of the axle tubes 14 and 16.

It should be noted that axle cooling is produced by a flood of lubricant in the axle tubes 14 and 16 whenever the different ring gear 24 rotates above a predetermined minimum speed and that lubricant flow increases with increasing ring gear speed. In order to insure that the reservoir 30 in the bottom of the differential gear housing 12 is not starved of lubricant at high ring gear speeds, the lubricant cooling system of this invention also preferably includes a restriction in the lubricant passage 38 so that the flow of lubricant in the axle tubes 14 and 16 remains relatively constant after the ring gear reaches a predetermined maximum speed. As indicated earlier, the restriction may be provided by the T-shaped lubricant passage 34 which require the lubricant to turn a sharp corner as it flows from the vertical intake passages 36 into the horizontal outlet branches 38A and 38B.

My invention also provides sudden cooling of the reservoir 30 under idle conditions. As soon as the vehicle stops and the ring gear 24 stops rotating, the flood of lubricant in the axle tubes 14 and 16 empties into the reservoir 30 immediately. The cooler lubricant from the axle tubes 14 and 16 mixes with the hotter lubricant in the reservoir 30 reducing the overall temperature of the lubricant in the reservoir 30 for cooling the differential components inside the gear housing 12.

FIGS. 7–10 show an alternate two-piece cooler cover 100 that can be used in place of the one piece cooler cover 26 in the lubricant cooling system described above. In this arrangement, the cover 100 comprises a sheet metal cover 126 that has a T-shaped embossment 127 and an insert 128 that is welded to inside surfaces of the cover 126. The insert 128 is also T-shaped and fit to indented portions in the inside of the cover 126 to form a T-shaped lubricant passage 134.

The lubricant passage 134 has a vertical intake passage 136 that is formed by a vertical portion 127a of the cover embossment 127 and a vertical portion 128a of the insert 128. The vertical portion 128a of the insert 128 is short so that a large inlet 144 is formed for the intake passage 134 when the insert 128 is attached to the cover 126 as best shown in FIG. 10.

Figure 8:
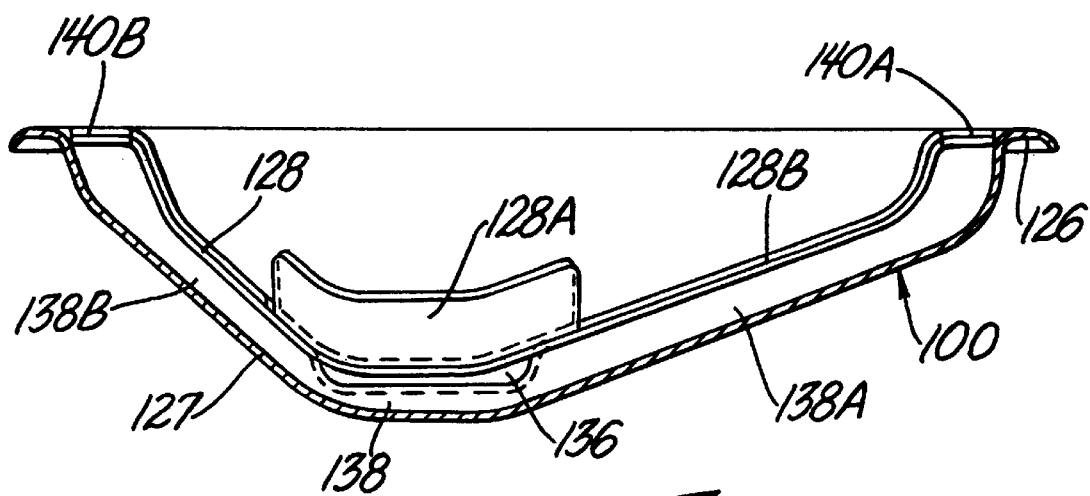
FIG. 8 is a section taken substantially along the line 8—8 of FIG. 7 looking in the direction of the arrows.

The lubricant passage 134 also has a horizontal passage 138 that is formed by a horizontal portion 127b of the cover embossment 127 and a horizontal portion 128b of the insert 128 as shown in FIGS. 8, 9 and 10. The horizontal passage 138 is intersected by the vertical passage 136 to form outlet branches 138A and 138B. The horizontal portion 128b of the insert 128 is also shorter than the horizontal portion 127b of the cover embossment 127 to provide outlets 140A and 140B at the outer ends of the outlet branches 138A and 138B.

The two piece cover 100 is attached to the gear housing 12 shown in FIG. 1 so that the outlets 140A and 140B are aligned with the outlets 42A and 42B of the gear housing 12. When the two-piece cover 100 is installed on the gear housing 12, modified drive axle assembly 10 still includes the lubricant cooling system of my invention that operates in substantially the same way as described above. In this regard it should be noted that the outlets of the branches 138A and 138B may be provided by the outlets 42A and 42B of the gear housing 12 provide the require sizing for the outlets of the branches 138A and 138B in the event that the outlet 140A and 140B are not as precise as outlets 40A and 40B.

Existing driving axle assemblies may be retrofitted with my lubricant cooling system simply by substituting a cooler cover, such as the cooler cover 26 or 100 for the old cover and drilling outlet passages for the axle tubes of the proper size.

In summary, the drive axle assembly 10 of this invention has a simple and efficient lubricant cooling system that is operated solely by the inherent rotation of the differential ring gear during vehicle movement. Moreover the lubricant cooling system can be incorporated in existing drive axle assemblies with little modification of existing parts and the substitution of a relatively inexpensive cooler cover that is easily installed in the drive axle assembly. Of course scoops such as those illustrated in the Mulford patent and other enhancers can be used without departing from the scope of the invention.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A drive axle asembly having a gear housing and axle tubes extending outwardly of the gear housing, a lubricant reservoir in the gear housing, a rotatable member forming part of a gear assembly rotatably rotatable member forming part of a gear assembly rotatably mounted in the gear housing, the rotatable member being at least partially disposed in lubricant in the lubricant reservoir and a lubricant cooling system, the lubricant cooling system comprising:

a lubricant passage in fluid communication with the lubricant reservoir via an inlet that is exposed to lubricant in the lubricant reservoir, the inlet being disposed with respect to the rotatable member so that lubricant flows into the lubricant passage when the rotatable inenber rotates, the lubricant passage having outlets adjacent inner ends of the respective axle tubes and communicating directly with the respective inner ends of the axle tubes for delivering lubricant from the lubricant passage to the respective axle tubes, the axle tubes communicating with outlet passages that are in fluid communication with the reservoir for returning lubricant from the axle tubes to the reservoir, and the outlets of the lubricant passage and the outlet passages being sized so that there is a flood of lubricant in the axle tubes that engages inner surfaces of the axle tubes and outer surfaces of the axle shafts when the rotatable member rotates at a predetermined minimum speed.

2. The drive axle assembly as defined in claim 1 wherein the lubricant passage includes a vertical intake passage that is aligned with the rotatable member and a second passage that is intersected by the vertical intake passage to provide branch outlets leading to the respective axle tubes, the second passage having a greater depth at the intersection with the vertical intake passage.

3. The drive axle assembly as defined in claim 1 wherein the outlets and the outlet passages are located in sleeve portions of the gear housing between bearings for supporting the gear assembly and inner ends of the axle tubes that are supported in the sleeve portions.

4. The drive axle assembly as defined in claim 1 wherein the outlets and the outlet passages are vertically aligned.

5. The drive axle assembly as defined in claim 1 wherein the outlets and the outlet passages are located in sleeve portions of the gear housing for attaching inner ends of the axle tubes.

6. The drive axle assembly as defined in claim 1 wherein the flood of lubricant in the axle tubes rises above the centerlines of the respective axle shafts from the inner ends of the respective axle tubes to their respective outer ends.

7. The drive axle assembly as defined in claim 6 wherein the flood of lubricant immerses the axle shafts in lubricant so as to churn and mix the lubricant.

8. The drive axle assembly as defined in claim 1 wherein the lubricant passage is in a cover for the gear housing.

9. The drive axle assembly as defined in claim 8 wherein the cover comprises a formed cover and an insert that is attached to the formed cover to form the lubricant passage.

10. The drive axle assembly as defined in claim 8 wherein the cover is a one-piece member.

11. The drive axle assembly as defined in claim 8 wherein the lubricant passage is T-shaped comprising a vertical intake passage that is aligned with the rotatable member and a horizontal passage that is intersected by the vertical intake passage to provide branch outlets leading to the respective axle tubes.

12. The drive axle assembly as defined in claim 11 wherein the horizontal passage has a greater depth at the intersection with the vertical intake passage.

13. A drive axle assembly having a gear housing and a hollow member attached to the gear housing that is kept at relatively low temperature by ambient air flowing over outer surfaces of the member caused by motion of a vehicle in which the drive axle assembly is installed, a lubricant reservoir in the gear housing, a rotatable member forming part of a gear assembly rotatably mounted in the gear housing, the rotatable member being at least partially disposed in lubricant in the lubricant reservoir and a lubricant cooling system, the lubricant cooling system comprising:

a lubricant passage in fluid communication with the lubricant reservoir via an inlet that is exposed to lubricant in the lubricant reservoir, the inlet being disposed with respect to the rotatable member so that lubricant flows into the lubricant passage when the rotatable member rotates, the lubricant passage having an outlet adjacent an inner end of the hollow member and communicating directly with the hollow inner end of the member for delivering lubricant from the lubricant passage to the hollow member, the hollow member communicating with an outlet passage that is in fluid communication with the reservoir for returning lubricant from the hollow member to the reservoir, and the outlet of the lubricant passage and the outlet passage being sized so that there is a flood of lubricant in the hollow member that engages an inner surface of the hollow member without any need for an internal or external duct when the rotatable member rotates at a predetermined minimum speed.

* * * * *